(12) United States Patent
Gutchigian

(10) Patent No.: US 7,243,158 B1
(45) Date of Patent: Jul. 10, 2007

(54) METHOD, SYSTEM AND COMPUTER PROGRAM FOR IDENTIFICATION OF DATA AND TRANSLATION OF DATA BETWEEN STORAGE LOCATIONS

(76) Inventor: Thomas Gutchigian, 2 Cambridge Way, Voorhees, NJ (US) 08043

( * ) Notice: Subject to any disclaimer, the term of this patent is extended or adjusted under 35 U.S.C. 154(b) by 808 days.

(21) Appl. No.: 10/353,363

(22) Filed: Jan. 28, 2003

(51) Int. Cl.
*G06F 15/13* (2006.01)

(52) U.S. Cl. .................. 709/236; 707/200; 707/201; 710/100

(58) Field of Classification Search ............. 709/236; 707/200, 201; 710/100
See application file for complete search history.

(56) References Cited

U.S. PATENT DOCUMENTS

| | | | |
|---|---|---|---|
| 5,021,995 A | 6/1991 | Quint et al. | |
| 5,493,671 A | 2/1996 | Pitt et al. | |
| 5,608,874 A | 3/1997 | Ogawa et al. | |
| 5,864,870 A | 1/1999 | Guck | |
| 5,999,937 A | 12/1999 | Ellard | |
| 6,009,436 A | 12/1999 | Motoyama et al. | |
| 6,032,147 A | 2/2000 | Williams et al. | |
| 6,044,381 A * | 3/2000 | Boothby et al. ............ | 707/201 |
| 6,088,747 A | 7/2000 | Cotugno et al. | |
| 6,108,669 A | 8/2000 | Dalenberg et al. | |
| 6,148,305 A | 11/2000 | Ikegaya et al. | |
| 6,189,045 B1 | 2/2001 | O'Shea et al. | |
| 6,195,658 B1 | 2/2001 | Comito et al. | |
| 6,195,664 B1 | 2/2001 | Tolfa | |
| 6,249,786 B1 | 6/2001 | Wadewitz | |
| 6,260,043 B1 | 7/2001 | Puri et al. | |
| 6,356,901 B1 | 3/2002 | MacLeod et al. | |
| 6,356,916 B1 | 3/2002 | Yamatari et al. | |
| 6,377,952 B1 | 4/2002 | Inohara et al. | |
| 6,385,606 B2 | 5/2002 | Inohara et al. | |
| 6,407,820 B1 | 6/2002 | Hansen et al. | |
| 6,430,563 B1 | 8/2002 | Frtiz et al. | |
| 6,442,570 B1 * | 8/2002 | Wu ........................... | 707/201 |
| 6,445,919 B1 | 9/2002 | Snonvieri | |
| 6,446,036 B1 | 9/2002 | Bourbonnais et al. | |
| 6,477,543 B1 * | 11/2002 | Huang et al. ............. | 707/200 |
| 6,633,924 B1 * | 10/2003 | Wu et al. ................... | 719/328 |
| 6,671,757 B1 * | 12/2003 | Multer et al. ............. | 710/100 |
| 6,799,190 B1 * | 9/2004 | Boothby ..................... | 707/204 |
| 2001/0039540 A1 | 11/2001 | Hofmann et al. | |

* cited by examiner

*Primary Examiner*—Jinsong Hu
(74) *Attorney, Agent, or Firm*—Duane Morris, LLP

(57) ABSTRACT

A method for configuration of a data lens for use in translation of information between first information located in a first information storage location and stored in a first information format and a second information stored in a second information storage location and stored in a second information format, comprising the steps of determining the creator of the first information; determining the nature of said first information; determining the first information storage location; and determining a manner of recognizing items and elements in the first information. A method for translating information between first information in a first data format in a first data storage location and information in a second data storage format in a second data storage location includes identifying changed information in the first information, and using iterative techniques to determine if a corresponding qualifier may be identified. Additional qualifiers may be added as a result of identifying matching items in the two storage locations.

12 Claims, 3 Drawing Sheets

METHOD, SYSTEM AND COMPUTER PROGRAM FOR IDENTIFICATION OF DATA AND TRANSLATION OF DATA BETWEEN STORAGE LOCATIONS

FIELD OF THE INVENTION

The present invention is in the field of data handling, and in particular in the field of synchronizing and translating data between more than one data format.

BACKGROUND

Conversion of data between different file formats is desirable in a wide variety of computing environments. For example, conversion of information between two different database formats is often highly desirable for synchronization of data. For individual users, synchronization of data between PDA's and desktop computers is an obvious example. For business users, synchronization of data between files created by different software on the same network, or between programs running on mainframes, on the one hand, and programs running on Windows computers, on the other, are examples. A further example is the conversion of video between different data formats.

SUMMARY OF THE INVENTION

According to one aspect of the invention, a method is provided for configuration of a data lens for use in translation of information between first information located in a first information storage location and stored in a first information format and second information located in a second information storage location and stored in a second information format. The method includes the steps of determining the creator of the first information, determining the nature of the first information, determining the first information storage location; and determining a manner of recognizing items and elements in the first information.

According to another aspect of the invention, a method is provided for synchronizing first information with second information. The first information is made up of first items, having first elements, and is located in a first information storage location and stored in a first information format. The second information is made up of second items, having second elements. The second information is located in a second information storage location and stored in a second information format. The method includes iterative techniques to match items that have been changed since the most recent synchronization with corresponding items in the second information. The method includes identifying each first item that has changed subsequent to a most recent prior synchronization; for each first element of the changed first items, determining whether a qualifier is associated with the element and identifying the associated qualifier; for each of said identified first elements not associated with a qualifier, inquiring whether a qualifier should be added, and adding to said first data lens a qualifier associated with said identified first element upon receipt of an affirmative response; and for each of said identified first elements associated with a qualifier, translating the first elements into said second information format.

In accordance with the invention, computer systems may be provided for carrying out the methods set forth above. Computer programs may be provided with instructions stored on a medium which instructions, when processed by a processor, cause the processor to carry out the steps in the methods set fort above.

DETAILED DESCRIPTION

The invention includes a method, system and computer program for translating data stored in one format in a first information storage location to data stored in a second format in a second information storage location. The method, system and computer program include a process of configuration of a data lens, methods for accurate translation of altered items after a first synchronization and for accurate translation of new items after a first translation.

Certain terminology employed in the present document is explained below.

An "information storage location" refers to the information needed to access information. Information storage location includes by way of example such information as directories, either on a standalone computer system, or on a network, or accessible over an intranet or internet, ports for devices such as PDAs and cellular telephones. Information storage location also includes such information as login identification codes and passwords required to access stored information.

A "creator" of information is a computer program, device, protocol or standard used to create the information. The creator may be off-the-shelf software, customized off-the-shelf software, or software that is not generally available, such as a custom database product prepared for one entity. The creator may be a standard, such as an XML extension for a particular purpose. The definition of creator may include such information as the version and the nature of any customizations, such as customization for different alphabets, regional data conventions, and other conventions. A complete definition of a creator determines a data format.

The "nature" of information includes a general purpose of the information, such as to convey information about individuals, entities, assets, or any other type of information that may be the subject of a data collection. Examples of the nature of information include contact information for individuals, financial information concerning businesses and identification of items in an inventory.

An "element" of information is, for example, a field in a database.

An "item" of information is, for example, a record in a database.

A "data lens" refers to any configuration of software and/or hardware that provides information concerning the content and changes in content of a data storage location for use by a translator. A data lens may include mapping between elements in a first data format and elements in a common or universal data format.

A "qualifier" is a component of a data lens that maps an element in an item between a data format and a universal data format.

Figure 1:
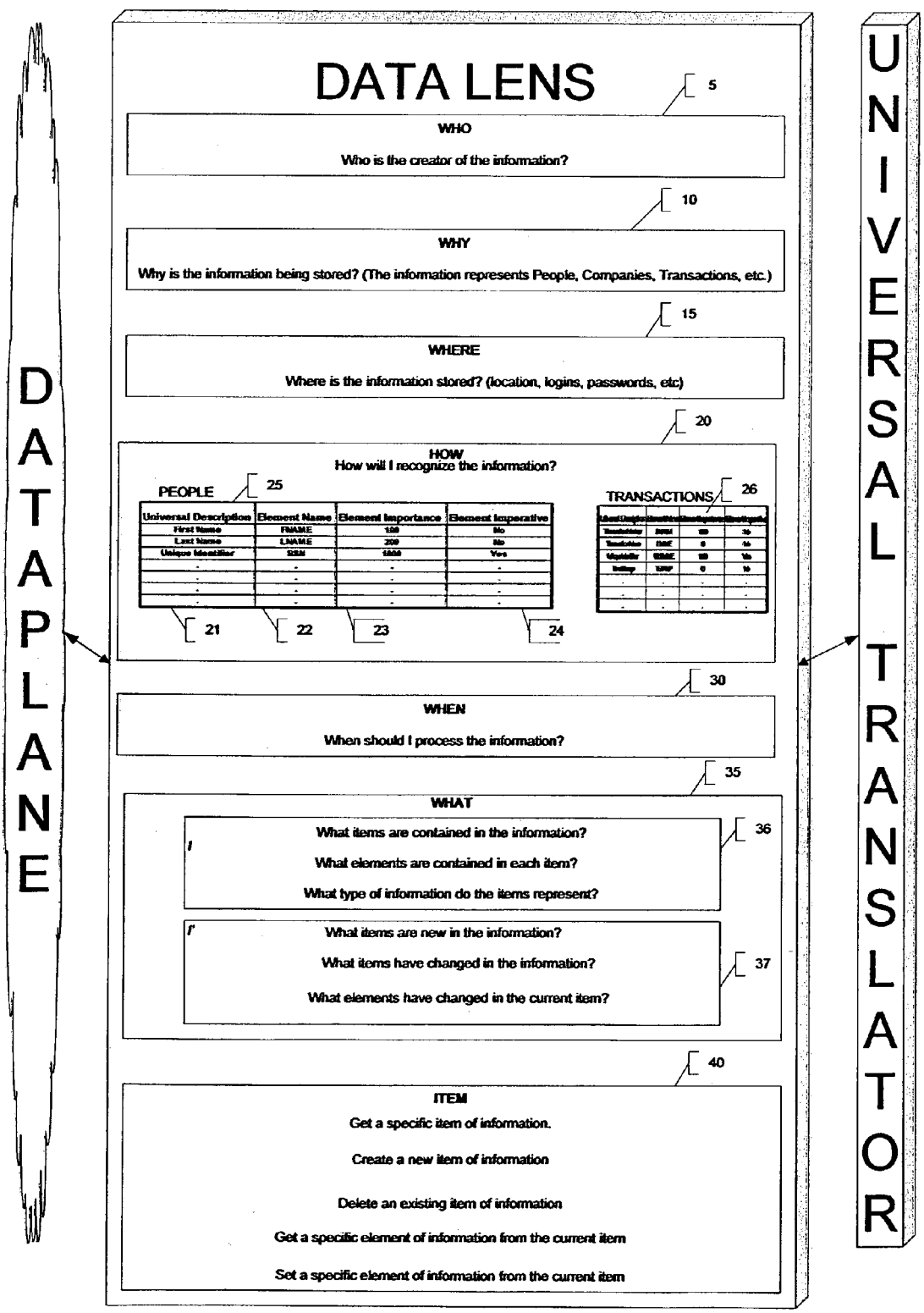
FIG. 1 is a schematic representation of a data lens of the invention.

Referring now to FIG. 1, there is shown a schematic representation of a data lens. As indicated by FIG. 1, the data lens contains certain information regarding a set of information. This information includes creator information 5, purpose information 10, location information 15, and recognition information 20. Recognition information may include universal data format descriptions 21, elements names 22, element importance level 23, whether the element is imperative 24, for various types of information, such as people 25 and transactions 26. This recognition information within a data lens may be in the nature of a flat file or a relational database, depending on the specifics of the information being processed by the data lens. Other types of information with different natures will have their own flat or relational database analogous to 25 and 26 within the data lens. Depending on the requirements of the underlying algorithms used in the recognition process, additional complexity may be required within the flat or relational databases 25 and 26. It should be noted that appropriate algorithms may be developed by those of skill in the art in accordance with the present invention. Timing information may be provided, as indicated at 30. The natures of the information stored is provided in block 35, which may include both current information, as indicated at 36, and records relating to changes in the item, on an item-by-item basis, as indicated at 37. Such information includes the creator, nature, and location of information, qualifiers for the information, manners of recognizing information, and times for processing information. As indicated at 40, the lens contains a number of operational instructions. These instructions include obtaining a specific item, creating a new item, getting a specific element from the current item, and altering an element in the current item.

Figure 2:
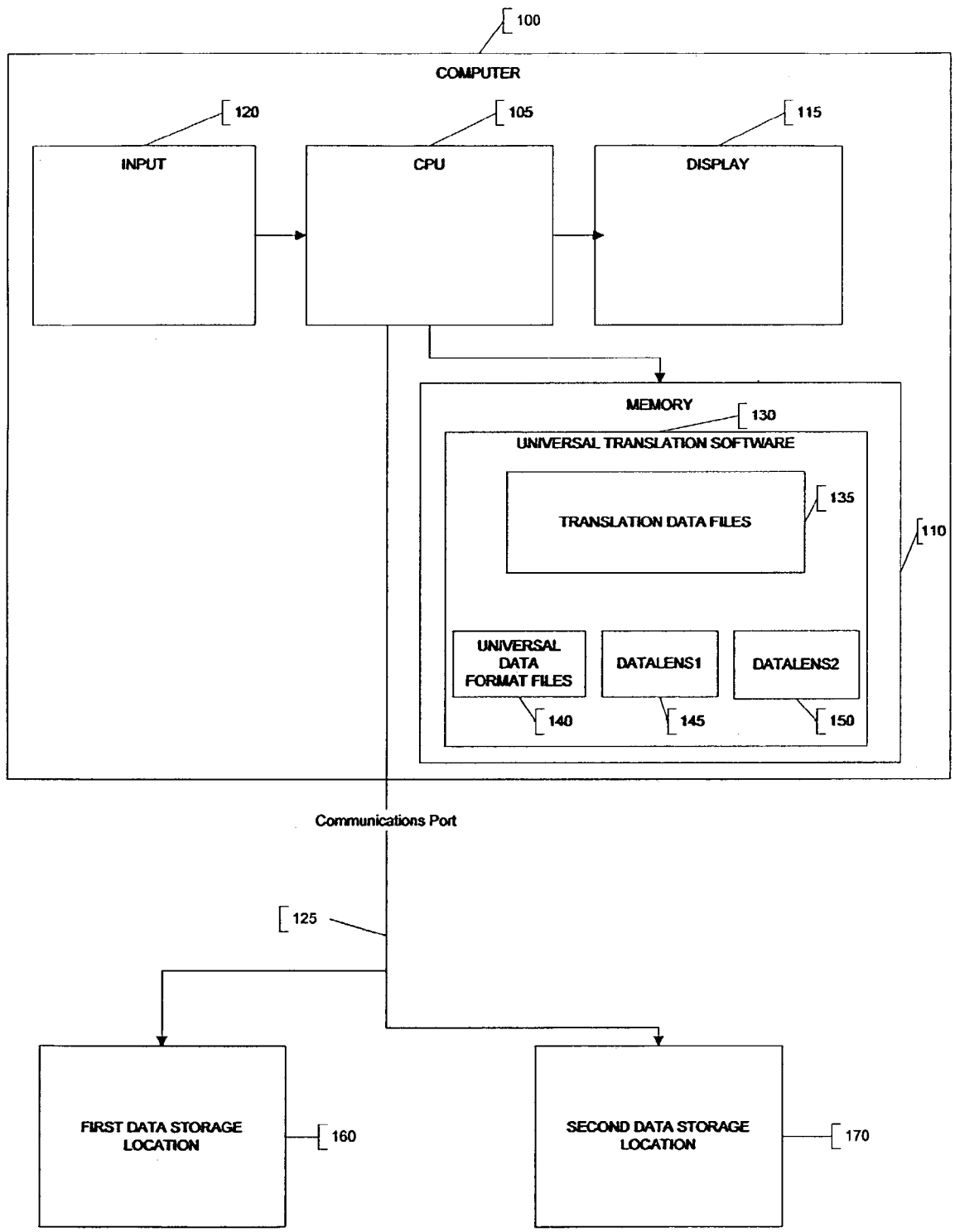
FIG. 2 is a schematic representation of an environment for use of the invention.

The method, system and computer program of the invention will now be explained with reference to an exemplary embodiment as shown in FIG. 2. There is shown a computer 100 depicted in simplified schematic format. Computer 100 has CPU 105, memory 110, display 115, input 120, and communications ports 125. Rather than communications ports 125, information could be transferred via disk input/outputs to local disk drivers. Universal translation software 130 according to the invention is in memory 110. Universal translation software 130 includes translation data files 135, universal data format files 140, first data lens files 145, and second data lens 150. Communications ports 125 are in communication with first data storage location 160 and second data storage location 170. Information at first data storage location 160 is in a first data format, and information at second data storage location 170 is in a second data format.

Universal translation software 130 creates the translation definitions and configures the first data lens with respect to information at first data location. A software user may be prompted to provide the identity of the creator of the information, such as from a pull down menu of data formats. The user may be prompted to furnish the nature of the information, such as from a pull-down menu. The user may be prompted to identify the first information storage location, by providing the file location and such information as login identification and passwords required to access the first data location. Based on information relating to the identity of the creator of the information and the natures of the information, the software determines rules for recognizing elements and items within the first information. This step is also the step of creating qualifiers to map between a universal data format and the first information format. These steps are sufficient to configure a data lens. However, additional configuration steps may be applied to a data lens. For example, a schedule of times for synchronization may be provided.

The foregoing configuration process is repeated with respect to the second data lens. This process may be repeated with respect to as many data lenses as desired.

Figure 3:
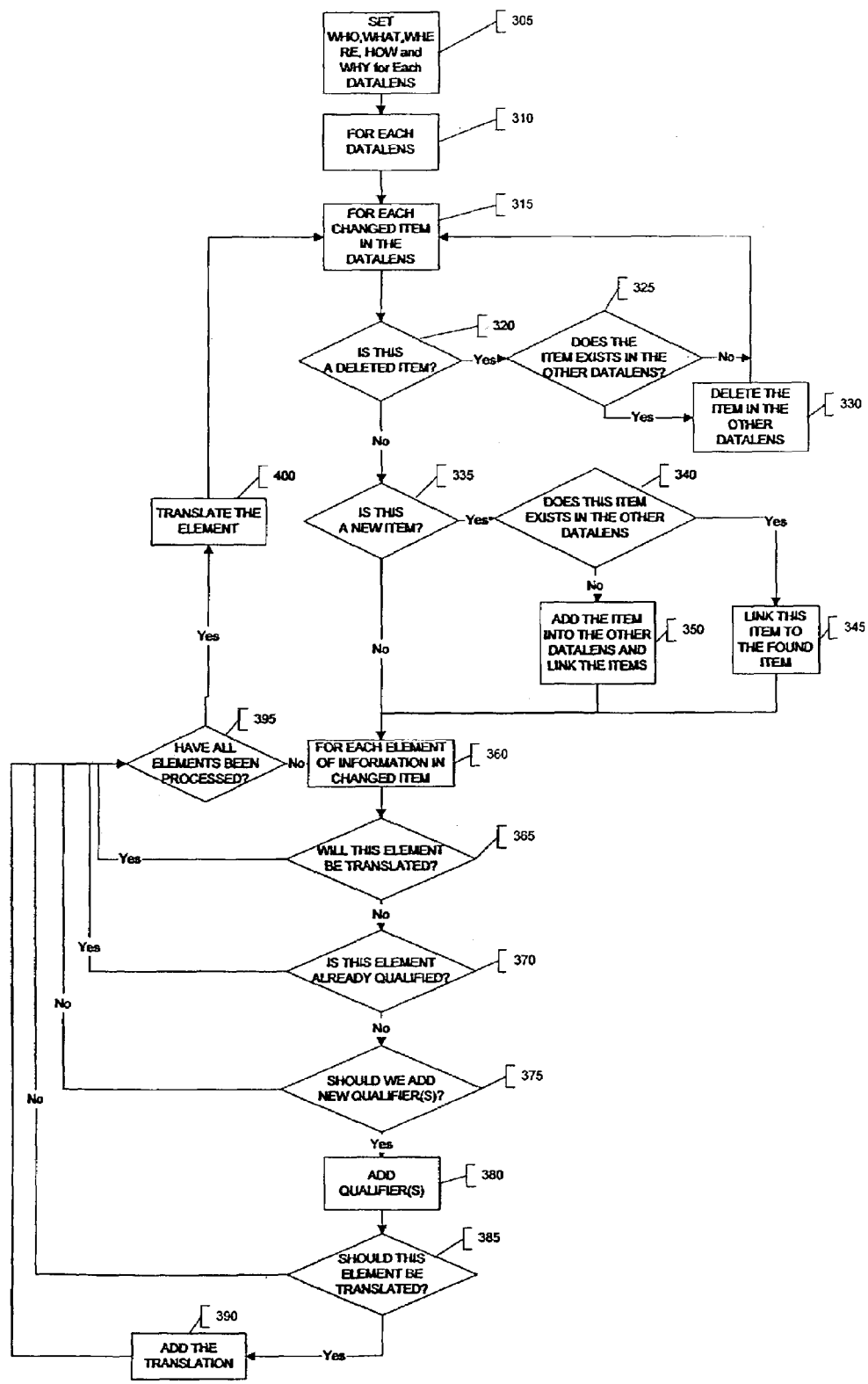
FIG. 3 is a process flow diagram illustrating the method of the invention.

Referring now to FIG. 3, the process of translation in accordance with the invention will be described. The process flow commences with the configuration of each data lens, as indicated by block 305. The number of data lenses is potentially unlimited. For the purposes of illustration, the process flow is described below with respect to two data lenses. The types of data to be translated are also unlimited. For purposes of illustration, the process flow is described with respect to synchronization of information contained in two databases.

As indicated by block 310, the process flow is carried out with respect to each data lens. The first step in the process is the review of each item in the current version of the data lens. The content of a data lens is a snapshot of the information in a first data storage location. Each item is reviewed to determine if the item has been changed. A "changed" item is one of new, deleted, or altered. For new items, the data lens has no record of any content for the item in a prior instance of the data lens. For deleted items, there is now no content in an item where the data lens has a record of prior content. For altered content, there is a difference between the current content and prior content shown in the data lens. If this process is the first review of the information in a data storage location, then all items will be new.

The process flow proceeds sequentially through each changed item, as indicated by block 315. In this exemplary process flow, it is first determined whether the changed item is a deleted item, as indicated by block 320. If the item is a deleted item, then the next step in the process flow is the determination of whether the same item is found in the second data lens, as indicated by block 325. If the same item is found in the second data lens, then the item is deleted from the second data lens, as indicated by block 330. The process is then completed as to that item, and the process flow returns to block 315 to evaluate the next changed item. If the item is not found in the second data lens, then the process flow is also complete as to the item, and the process flow returns to block 315 to evaluate the next changed item.

If the item is a new item, as indicated by block 335, the process proceeds to determining whether the item exists in the second data lens, as indicated by block 340. If the same item is found in the second data lens, then the data lenses are updated to reflect a link between the items, as indicated by block 345. A link means that the item in both data lenses maps to the same item in the universal or common format. The process flow then proceeds to the steps in common for all changed items.

If the new item is not identified in the other data lens, then the new item is added into the second data lens, as indicated by block 350. When this step is completed, the process flow also proceeds to the steps in common for all changed items.

The steps in common for all changed items commence at block 360. As indicated by block 360, these steps are processed for each element in each changed item. The process first ascertains if the element is to be translated, as indicated by block 365. This step may include prompting a user to indicate whether the item is to be translated, for example. As an alternative example, a rules table may be provided to determine whether a given element is to be translated, and the rules table may be consulted. If the item is to be translated, it may be immediately translated or tagged for later translation after processing of all the elements in the item. If the element is not to be translated, then the next inquiry is whether the element is qualified, as indicated by block 370. A qualified element is one which has an identified correspondence to an element in a universal or common format. If the element is not qualified, then the process flow determines whether one or more new qualifiers are to be added to accommodate the element, as indicated by block 375. Since there may not be a one-to-one correspondence between elements in the first data format and elements in the common data format, it may be necessary to add multiple qualifiers for a single element. The determination of whether to add a qualifier may be made by prompting a user for input, for example, or by means such as use of a rules table. The qualifier is then added, as indicated by block 380. If no new qualifiers were to be added, then the process flow proceeds to determine if there are more elements to process. The process flow then proceeds to determining whether the element should be translated, as indicated by block 385. As above, this may be determined by prompting a user, consulting a rules table, or other suitable means. If the translation is to be made, then the translation must be added. The user may be prompted to furnish the translation, as indicated by block 390. If all elements in the item have been processed, as indicated by block 395, then the elements are translated, as indicated by block 400.

The above process is repeated for changed items in the second data lens, and in any additional data lenses. As to each item, the data lenses store whether the item was changed. The data lenses may record additional information, including whether the change was a deletion, a new item, or an alteration, and may include the prior elements if desired.

Various analyses based on changes in data may be carried out. For example, rates of change of data in one information storage location may be calculated. Such rates of change may be analyzed to identify anomalies that may indicate failures to update information, sabotage, viruses, or other issues affecting the data.

At any point in the foregoing process, switches may be provided. Users may be able to set defaults, or may be prompted at various points throughout the process. Rules tables may also be created to provide decision-making for switches.

The methods of the invention may be employed to configure a data lens for a format with relatively little need for a human operator. This process commences with a first data lens that has been completely configured. A second data lens is created for data of the same type. The second data lens is initially not configured at all. A user creates a limited number of universal qualifiers for the second data lens. The limited number will vary depending on the nature and size of the data. For example, in the example of two data lenses for matching data involving contact information regarding individuals, it may be sufficient to create universal qualifiers for the second data lens for elements representing last name, first name, and primary telephone number. The iterative process described above will then create the remaining universal qualifiers and define the translation as required. It will be appreciated that any number of switches may be provided for humans to check the accuracy of the configuration of the data lens during the process. This application of the process of the invention means that translations of data between two different data formats may be carried out with a minimum of human effort and hence at reduced cost.

The methods of the invention are not configured to use with databases, but may be used in connection with the conversion of data any one format to another. By way of example, the methods of the invention may be used in the translation of digital video between formats. In this case, the items within a data lens represent specific frames of video sequence, and the elements may include specific pixel information, format information, compression information, and the like. It will be understood that creation of a data lens for any video format allows conversion into all other video formats with a completely configured data lens.

The methods of the invention may be applied to any information being created in real time in the same manner as a conventional database. For example, the methods may be applied to processing of human speeds or of a text feed. Each word may be treated as a new item. A data lens is applied to each language, in which each known word in the language is represented as an element of each item. Each element, or word, that has been qualified in a data lens can then be translated into any language that has a data lens with the corresponding qualifier.

In another example, the method of the invention may be applied to telemetry of any type. In one example, a real-time securities data feed is available at a specified location. The location may be an Internet address, by way of example. A data lens is configured to identify securities which have information appearing at the location. The data lens may cause the address to be periodically polled, and the updated data placed in the data lens. A corresponding data lens may serve such purposes as providing a translation to a particular location in a spreadsheet representing the holdings of a securities firm customer. The method of the invention may then be used to update the value of the holdings in real time. It will be appreciated that this method may be used to collect other types of data from a variety of locations in a network or on the Internet.

In another example, the methods may be employed in the translation of documents between differing word processing software formats. Items are formats, and elements would be details of formatting instructions.

The method of the invention not only translates between formats, but also increases what is known about the nature of translation. The method provides for the expansion of what is known about a specific translation, and for the automatic propagation of this additional knowledge to other data lenses using the same universal qualifiers. Specifically, in the process described above, at the step of determining whether one or more qualifiers must be added, at block 375 of FIG. 3, the process is privy to all elements of the same item in both data lenses; the elements in each data lens can be processed by establishing new qualifiers for commonality. Upon establishing commonality within specific elements a new universal qualifier is optionally created in both data lenses or an existing universal qualifier is propagated between the data lenses.

It will be understood that the foregoing method is accomplished in computer programs which are stored on a storage medium, and contain instructions which, when executed on a computer, cause the computer to carry out the steps of the method. The invention may also be characterized as a computer system having means for carrying out each of the steps set forth in the description of the process.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for translating first information, comprising first items, each of said first items having first elements, located in a first information storage location and stored in a first information format, with second information, comprising second items, each of said second items having second elements, located in a second information storage location and stored in a second information format, comprising the steps of:

providing a first data lens associated with said first information;

providing a second data lens associated with a second information;

identifying each first item that has changed relative to historical information for said first item;

identifying a first element associated with each of the identified changed first items;

for each of said identified first elements, determining whether a qualifier is associated with said element and identifying said associated qualifier; the associated qualifier being a component of the first data lens that maps the element between the first information format and a universal data format;

for each of said identified first elements not associated with a qualifier, inquiring whether a qualifier should be added, and adding to said first data lens a qualifier associated with said identified first element upon receipt of an affirmative response; wherein said inquiring step comprises either prompting a user for input or employing a rules table; and for each of said identified first elements associated with a qualifier, translating the first element into said second information format.

2. The method of claim 1, further comprising the steps of:

identifying deleted items among said identified changed first items, determining whether said second information storage location contains a second item corresponding to said deleted first item, and, if deleted second items corresponding to said deleted first item are identified, deleting said identified second items.

3. The method of claim 1, further comprising the steps of identifying new items, and, for each identified new item, adding a corresponding second item.

4. The method of claim 1, further comprising the steps of prompting a user to determine if an element is to be translated.

5. A system for translating first information, comprising first items, each of said first items having first elements, located in a first information storage location and stored in a first information format, with second information, comprising second items, each of said second items having second elements, located in a second information storage location and stored in a second information format, comprising:

first data lens associated with said first information;

second data lens means associated with a second information;

means for identifying each first item that has changed relative to historical information for said first item;

means for identifying a first element associated with each of the identified changed first items;

means for each of said identified first elements, determining whether a qualifier is associated with said element and identifying said associated qualifier; the associated qualifier being a component of the first data lens means that maps the element between the first information format and a universal data format;

means for inquiring, as to each of said identified first elements not associated with a qualifier, whether a qualifier should be added wherein said means for inquiring comprises either prompting a user for input or employing a rules table;

means for adding to said first data lens means a qualifier associated with said identified first element upon receipt of an affirmative response; and means for translating, as to each of said identified first elements associated with a qualifier, the first element into said second information format.

6. The system of claim 5, further comprising:

means for identifying deleted items among said identified changed first items, means for determining whether said second information storage location contains a second item corresponding to said deleted first item, and, means for deleting said identified second items if deleted second items corresponding to said deleted first item are identified.

7. The system of claim 5, further comprising means for identifying new items, and, means for, as to each identified new item, adding a corresponding second item.

8. The system of claim 5, further comprising means for prompting a user to determine if an element is to be translated.

9. A machine readable storage device tangibly embodying a series of instructions for translating first information, comprising a first items, each of said first items having first elements, located in a first information storage location and stored in a first information format, with second information, comprising second items, each of said second items having second elements, located in a second information storage location and stored in a second information format, the instructions being executable by a machine to perform a series of steps, the steps comprising:

providing a first data lens associated with said first information;

providing a second data lens associated with a second information;

identifying each first item that has changed relative to historical information for said first item;

identifying a first element associated with each of the identified changed first items;

for each of said identified first elements, determining whether a qualifier is associated with said element and identifying said associated qualifier; the associated qualifier being a component of the first data lens that maps the element between the first information format and a universal data format;

for each of said identified first elements not associated with a qualifier, inquiring whether a qualifier should be added, and adding to said first data lens a qualifier associated with said identified first element upon receipt of an affirmative response; wherein said inquiring step comprises either prompting a user for input or employing a rules table; and for each of said identified first elements associated with a qualifier, translating the first element into said second information format.

10. The machine readable storage device of claim 9, further comprising instructions which when executed on a processor cause the processor to execute the steps of:

identifying deleted items among said identified changed first items, determining whether said second information storage location contains a second item corresponding to said deleted rust item, and, if deleted second items corresponding to said deleted first item are identified, deleting said identified second items.

11. The machine readable storage device of claim 9, further comprising instructions which when executed on a processor cause the processor to execute the steps of identifying new items, and, for each identified new item, adding a corresponding second item.

12. The machine readable storage device of claim 9, further comprising instructions which when executed on a processor cause the processor to execute the step of prompting a user to determine if an element is to be translated.

* * * * *